United States Patent
Tyagi et al.

(10) Patent No.: US 10,282,574 B1
(45) Date of Patent: May 7, 2019

(54) LOCATION CORRECTION APPARATUS AND METHOD IN A REAL-TIME LOCATING SYSTEM

(71) Applicant: MOTOROLA MOBILITY LLC, Chicago, IL (US)

(72) Inventors: Vivek Tyagi, Chicago, IL (US); Douglas Lautner, Round Lake, IL (US); Sudhir Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/913,904

(22) Filed: Mar. 6, 2018

(51) Int. Cl.
| | |
|---|---|
| G06K 19/00 | (2006.01) |
| G06K 7/10 | (2006.01) |
| G01S 5/02 | (2010.01) |
| G01S 5/10 | (2006.01) |
| H04N 7/18 | (2006.01) |

(52) U.S. Cl.
CPC ........ G06K 7/10297 (2013.01); G01S 5/0263 (2013.01); G01S 5/10 (2013.01); H04N 7/181 (2013.01)

(58) Field of Classification Search
USPC .......... 235/435, 439, 451, 487, 492; 340/10, 340/572
See application file for complete search history.

(56) References Cited

U.S. PATENT DOCUMENTS

| | | |
|---|---|---|
| 9,423,250 B1 | 8/2016 | Troy |
| 2003/0201934 A1 | 10/2003 | Asher et al. |
| 2009/0252303 A1 | 10/2009 | Agarwal |
| 2009/0326795 A1 | 12/2009 | Supino et al. |
| 2010/0295943 A1* | 11/2010 | Cha .................. G01S 13/82 348/143 |
| 2013/0277430 A1* | 10/2013 | Zumsteg ............ G06K 7/10009 235/462.09 |
| 2014/0005931 A1 | 1/2014 | Ono et al. |
| 2016/0071294 A1 | 3/2016 | Park et al. |
| 2017/0082727 A1 | 3/2017 | Sendonaris et al. |
| 2018/0172842 A1 | 6/2018 | Ding et al. |

* cited by examiner

*Primary Examiner* — Matthew Mikels
(74) *Attorney, Agent, or Firm* — Cygan Law Offices P.C.; Joseph T. Cygan (57) ABSTRACT

A method of operating a real time locating system (RTLS) includes: obtaining known RTLS coordinates of a reference point located within an RTLS perimeter; determining, by an RTLS tagged object, a difference between known RTLS coordinates of the reference point, and measured RTLS coordinates at the reference point location; and determining corrected RTLS coordinates for the RTLS tagged object using the difference.

20 Claims, 9 Drawing Sheets

LOCATION CORRECTION APPARATUS AND METHOD IN A REAL-TIME LOCATING SYSTEM

FIELD OF THE DISCLOSURE

The present disclosure relates generally to real-time locating systems (RTLS) and mobile devices and more particularly to location error correction within an RTLS.

BACKGROUND

In a real-time locating system (RTLS) an object that includes an RTLS mobile tag, or the mobile tag itself, is located by using its relationship with fixed anchors or otherwise by using the relationships between the mobile tag and fixed points in a mesh network. A central server can be employed to keep track of these objects, via their mobile tags, and their respective positions within a defined geographic perimeter. Such a defined geographic perimeter can be used to define a "geofence" which is a virtual fence around the defined geographic perimeter. In certain applications, a mobile device or a monitoring system within the RTLS system may also have a requirement for tracking one or more other moving objects, referred to as "objects of interest." For example, the object-of-interest's RTLS data can be obtained by an interested mobile device by accessing the central server, however the interested mobile device must be able to initially identify a specific moving object of interest in order to track its position.

Unfortunately, the location data in the RTLS system is prone to various errors. One example type of location data error is drift error. When drift error is present, the RTLS system can indicate different coordinate readings for the same location at different times. Factors that can contribute to location data errors include environmental changes, noise, interference, the introduction of additional objects of interest to track, etc. Drift errors can also impact RLTS system configuration and system parameters. Examples of changes in RTLS system parameters that can occur due to drift errors include changes in sampling rate, grid spacing, etc. which can cause system reboots.

Such errors build up exponentially and eventually have an adverse impact on RTLS system users. Present error correction techniques require bringing down the RLTS system and performing manual recalibration which is troublesome and time consuming.

DETAILED DESCRIPTION

Briefly, the present disclosure provides apparatuses and methods of operation for RLTS coordinate error determination and correction. One disclosed method of operating an RTLS includes: obtaining known RTLS coordinates of a reference point located within an RTLS perimeter; determining, by an RTLS tagged object, a difference between known RTLS coordinates of the reference point, and measured RTLS coordinates at the reference point location; and determining corrected RTLS coordinates for the RTLS tagged object using the difference.

In some embodiments, the method may further include bringing the RTLS tagged object in physical contact with the reference point; and determining the measured RTLS coordinates of the RTLS tagged object in physical contact with the reference point location.

In some embodiments, the RTLS tagged object may obtain the known RTLS coordinates of the reference point from an RTLS server. In other embodiments, the method may include scanning a near field communication (NFC) tag located at the reference point to obtain the known RTLS coordinates. The RLTS tagged object may send the corrected RTLS coordinates of the RTLS tagged object to an RTLS server, in response to determining the corrected RTLS coordinates. In some embodiments, the method may include determining that the RTLS tagged object is in physical contact with the reference point using an inertial measurement unit (IMU) of the RTLS tagged object; and determining the measured RTLS coordinates in response to IMU data indicating that the RTLS tagged object is in physical contact with the reference point.

Another disclosed method includes: obtaining known RTLS coordinates of first, second and third reference point within an RTLS perimeter; determining, by an RTLS tagged object, a first measured distance between the first and second reference points, and a second measured distance between the second reference point and the third reference point; determining a first error between the first measured distance and a known distance between the first and second reference points; determining a second error between the second measured distance and a known distance between the second and third reference points; and correcting the measured RTLS coordinates of the RTLS tagged object using the first error and the second error.

The method may further include: determining, by the RTLS tagged object, a first known distance between the first and second reference points, and a second known distance between the second reference point and the third reference point, using the known RTLS coordinates of the first, second and third reference points.

In some embodiments, the method may include: detecting that the RTLS tagged object is in physical contact sequentially with each of the first, second and third reference points; and determining the measured RTLS coordinates of the RTLS tagged object at each respective reference point in response to the RTLS tagged object being in physical contact with the respective reference point.

In other embodiments, the method may include: scanning a first, second, and third near field communication (NFC) tag to obtain the known RTLS coordinates of the first, second and third reference points, where the first, second and third NFC tags respectively are located at, and identify, the first, second and third reference points; determining the known distance between the first and second NFC tag, and the known distance between the second and third NFC tag, using the known RTLS coordinates of the first, second and third NFC tags; comparing the first measured distance with the known distance between the first and second NFC tags; and comparing the second measured distance with the known distance between the second and third NFC tags. The RTLS tagged object may also send the corrected RTLS coordinates of the RTLS tagged object to an RTLS server.

In some embodiments, the method may include: determining that the RTLS tagged object is in physical contact sequentially with each of the respective reference points using an inertial measurement unit (IMU) of the RTLS tagged object; and determining the measured RTLS coordinates at each respective reference point in response to IMU data indicating that the RTLS tagged object is in physical contact with the respective reference point.

A disclosed mobile device includes: an RTLS tag; an inertial measurement unit (IMU); and a processor, operatively coupled to the RTLS tag and to the IMU. The processor is operative to: obtain known RTLS coordinates of a reference point located within an RTLS perimeter; determine a difference between known RTLS coordinates of the reference point, and measured RTLS coordinates at the reference point location; and determine corrected RTLS coordinates for the mobile device using the difference.

In some embodiments, the mobile device processor is further operative to: determine that the mobile device is in physical contact with the reference point using IMU data; and determine the measured RTLS coordinates of the mobile device in physical contact with the reference point location.

In some embodiments, the mobile device processor is further operative to obtain the known RTLS coordinates of the reference point from an RTLS server using the RTLS tag. In other embodiments, the mobile device may further include a near field communication (NFC) module operatively coupled to the processor. The NFC module is operative to scan an NFC tag located at the reference point to obtain the known RTLS coordinates of the reference point.

Another disclose mobile device includes: an RTLS tag; an IMU; and a processor, operatively coupled to the RTLS tag and to the IMU. The RTLS processor is operative to: obtain known RTLS coordinates of first, second and third reference points within an RTLS perimeter; determine a first measured distance between the first and second reference points, and a second measured distance between the second reference point and the third reference point; determine a first error between the first measured distance and a known distance between the first and second reference points; determine a second error between the second measured distance and a known distance between the second and third reference points; and correct the measured RTLS coordinates of the mobile device using the first error and the second error. The processor may be further operative to: determine a first known distance between the first and second reference points, and a second known distance between the second reference point and the third reference point, using the known RTLS coordinates of the first, second and third reference points.

In some embodiments, the mobile device further includes an NFC module operatively coupled to the processor. The NFC module is operative to: scan a first, second, and third NFC tag to obtain the known RTLS coordinates of the first, second and third reference points, where the first, second and third NFC tags respectively are located at, and identify, the first, second and third reference points. In such embodiments, the processor is further operative to: determine the known distance between the first and second NFC tag, and the known distance between the second and third NFC tag, using the known RTLS coordinates of the first, second and third NFC tags; compare the first measured distance with the known distance between the first and second NFC tags; and compare the second measured distance with the known distance between the second and third NFC tags.

In other embodiments, the mobile device processor is further operative to: determine that the mobile is in physical contact sequentially with each of the respective reference points using the IMU; and determine the measured RTLS coordinates at each respective reference point in response to IMU data indicating that the mobile device is in physical contact with the respective reference point.

Figure 1:
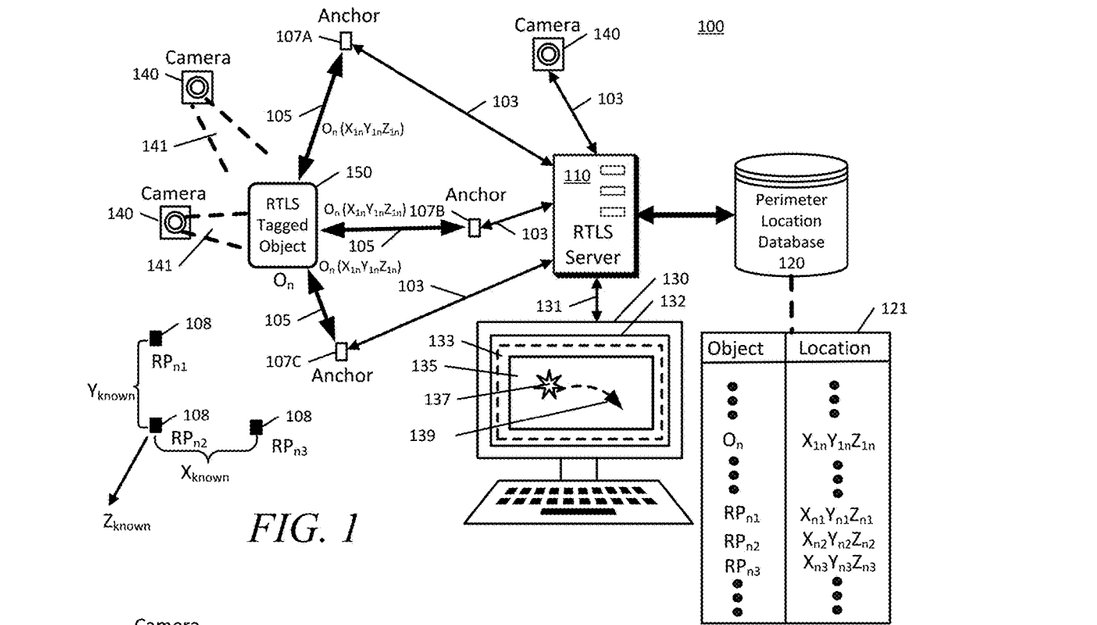
FIG. 1 is a diagram of a real-time location system (RTLS) in accordance with some embodiments, in which an object that has an RTLS tag attached or integrated internally, is operatively coupled to an RTLS server.

Turning now to the drawings wherein like numerals represent like components, FIG. 1 is a diagram of an example real time location system (RTLS) 100 in accordance with some embodiments. In FIG. 1, the example RTLS 100 includes video cameras 140 and anchor tags 107 which are placed at various positions within an RTLS perimeter, which is the physical area monitored by the RTLS 100. The video cameras 140 capture video data within their respective field-of-view 141. Any object that has an RTLS tag attached or integrated internally, such as RTLS tagged object 150, may be monitored and tracked as an object of interest by the RTLS 100. The RTLS tags within RTLS tagged objects are operatively coupled to an RTLS server 110 via either a web socket Internet connection or via a ZeroMQ connection with one or more of the anchor tags 107.

In the example of FIG. 1, the RTLS server 110 includes, or is operatively coupled to a perimeter location database 120. The perimeter location database 120 stores perimeter location data 121 which includes location coordinates for each one of the RTLS tagged objects within the RTLS 100 perimeter. The RTLS server 110 dynamically updates the perimeter location database 120 as the RTLS tagged objects move throughout the RTLS area.

The perimeter location database 120 also stores predetermined, known location coordinates for each of a set of fixed reference points 108 labeled in FIG. 1 as "RPn1," "RPn2," and "RPn3." The reference points 108 are used by RTLS tagged objects for calibration and error correction in accordance with various embodiments. The example reference points RPn1 and RPn2 are substantially aligned along the y-axis of the RTLS 100 perimeter and have a known distance between them indicated in FIG. 1 as "$Y_{known}$." Similarly, the reference points RPn2 and RPn3 are substantially aligned along the x-axis of the RTLS 100 perimeter and have a known distance between them indicated in FIG. 1 as "$X_{known}$." The three reference points may also be aligned at a substantially similar height with a known z-coordinate within the RTLS perimeter "$Z_{known}$." The reference points 108 will in most situations be positioned on a wall near eye-level and may be labeled or marked in various ways such as using a physical marking or label, a near field communication (NFC) tag, a Quick Response code (QR code) label, a bar code label, or some other appropriate label. An RTLS tagged object may obtain the known coordinates of the reference points 108 from the RTLS server 110, or from the label in some embodiments, and use the known coordinates for RTLS coordinate error correction.

The RTLS 100 includes at least three anchor tags 107A, 107B and 107C ("anchors"), and one of more video cameras 140, all of which are operatively coupled to the RTLS server 110 via connections 103. In the example shown, the RTLS tagged object 150 is connected to the RTLS server 110 via all three anchor tags 107A, 107B and 107C and receives or provides RTLS coordinate data 105 from and to each of the three anchor tags. The RTLS server 110 communicates with each of the three anchor tags 107A, 107B and 107C and performs triangulation calculations to determine the coordinates of the RTLS tagged object 150.

An example interested device 130, which may also be referred to herein as a "monitoring device," is operatively coupled to the RTLS server 110 via a web socket Internet connection 131, and shows a map 135 within a graphical user interface (GUI) 133 on a display 132. For an identified object of interest, the GUI 133 will display an overlay 137 such as, for example, an icon or avatar, at the RTLS 100 coordinate position within the map 135 and will subsequently track the movement 139 of the object of interest as it moves within the RTLS 100 area. For example, if the RTLS tagged object 150 is an object of interest, then the overlay 137, which may be an icon or avatar etc., will represent the position of RTLS tagged object 150 on the map 135.

Figure 2:
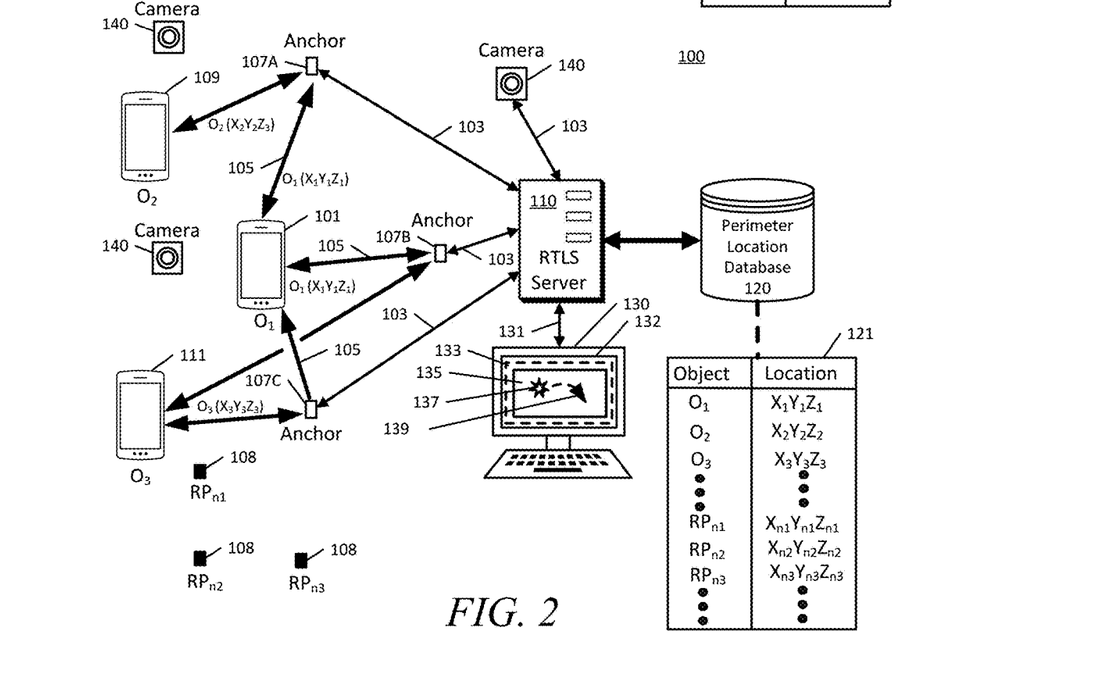
FIG. 2 is a diagram of the RTLS system of FIG. 1, in which each one of a group of mobile devices is an RTLS tagged object, and is assigned an object identifier in the perimeter location database, in accordance with some embodiments.

In the example of FIG. 2, each one of a group of mobile devices is an RTLS tagged object, and is assigned an object identifier in the perimeter location database 120. For example, "$O_1$" corresponds to mobile device 101, "$O_2$" corresponds to mobile device 109, "$O_3$" corresponds to mobile device 111, and so forth. In some embodiments, each one of the mobile devices communicates with the anchors 107 such that their positions within the RTLS are calculated by the RTLS server 110 by performing triangulation between the mobile devices and the anchors 107. However, in some embodiments the triangulation calculation may be done either by the RTLS server 110, or by the individual mobile devices, or by both. In the example RTLS 100, the mobile device 101 is designated as an "interested mobile device" (or "interested device") in that one or more of the other mobile devices is an object of interest that the mobile device 101 user wishes to track. Both the interested device 130 and mobile device 101 may be interested devices for the same or different objects of interest, and other mobile devices may act as interested devices as well. A mobile device may also be an interested device and an object of interest to another interested device at the same time. In other words, a mobile device may be tracking an object of interest and tracked as an objected of interest at the same time. The term "interested device" is used herein interchangeably with the term "monitoring device." Each mobile device display is operative to show a map of the perimeter location such as, but not limited to, a floor plan, similar to the map 135 displayed by interested device 130, when the mobile device functions as a monitoring device. A mobile device functioning as an interested device, or monitoring device, may visually track an object of interest by creating a graphics overlay approximately over the RTLS x-y coordinate points of the object of interest on the map. In some embodiments, a 3-dimensional view may be provided that includes the z-coordinate. The graphics overlay can be a visual indicator, such as a colored dot, a picture, avatar or icon, or a text box showing information about the object of interest or any other suitable information that allows the user to visually track the object of interest as it moves throughout the geography covered by the RTLS 100. Although the example refers to a "perimeter location database," it is to be understood that other geofenced areas may exist within the perimeter and these geofenced areas may be tracked separately from the overall perimeter.

The video cameras 140 are operative to observe each of the RTLS tagged objects when such objects are within the respective field of view of one or more video cameras. The mobile devices are operatively coupled to the RTLS server 110, using an internal RTLS tag, via either a web socket Internet connection or via a ZeroMQ connection with one or more of the anchor tags 107. The perimeter location database 120 stores perimeter location data 121 which includes X, Y and Z coordinates for each one of the RTLS tagged mobile devices, within the RTLS 100 area. The RTLS server 110 dynamically updates the perimeter location database 120 as the mobile devices or other RTLS tagged objects, move throughout the RTLS area.

In the example shown in FIG. 2, the mobile device 101 is connected to the RTLS server via all three anchor tags 107A, 107B and 107C and receives RTLS coordinate data 105 from each of the three anchor tags. The mobile device 101 may communicate with each of the three anchor tags 107 and the RTLS server 110 performs triangulation calculations to determine the mobile device 101 coordinates. The mobile device 101 may obtain the known coordinates of the reference points 108 from the RTLS server 110 by communicating with the RTLS server 110 through the anchors 107, or may obtain the known coordinates at the reference points 108 by, for example, scanning a QR code or an NFC tag positioned at the reference point. The mobile device 101 is operative to obtain the known coordinates and measure or obtain the mobile device 101 RTLS coordinates at the position of the reference points 108. The mobile device 101 is also operative to determine the difference between the measured RTLS coordinates and the known coordinates of the reference points. In other words, the mobile device 101 is operative to determine error in its RTLS coordinates using the known coordinates of the reference points 108. The mobile device 101 may either send the determined error to the RTLS server 110 such that the RTLS server 110 makes appropriate corrections, or the mobile device 110 may correct its RTLS coordinates and send the corrected coordinates to the RTLS server 110 such that the RTLS server 110 may recalibrate and adjust accordingly.

The mobile device 101 may determine its measured RTLS coordinates at a reference point when it is in a given proximity to particular reference point. In embodiments in which an NFC tag is used, the mobile device 101 may determine its measured RTLS coordinates upon scanning the NFC tag to obtain the known coordinates of the reference point, because the scanning operation places the mobile device 101 in close proximity to the reference point. In other embodiments, the mobile device 101 may determine that it has physically contacted the reference point using its inertial measurement unit (IMU). For example, a location error correction application on the mobile device 101 may prompt the user via the mobile device display or other user interface mechanism, to tap or touch the reference point with the mobile device 101. The application can detect the physical contact using IMU data and accordingly, in response, measure the RTLS coordinates at that time or obtain the RTLS coordinates as an update from the RTLS server 110. The mobile device 101 may then perform further error correction operations.

The IMU of the mobile device 101 may also provide error correction data to the RTLS server 110 including IMU data showing whether the mobile device is stationary or moving, and the mobile device direction and velocity. The RTLS server 110 accordingly applies dynamic error correction to the mobile device RTLS location coordinates to correct for latency, overshoot and direction determination errors.

Figure 3:
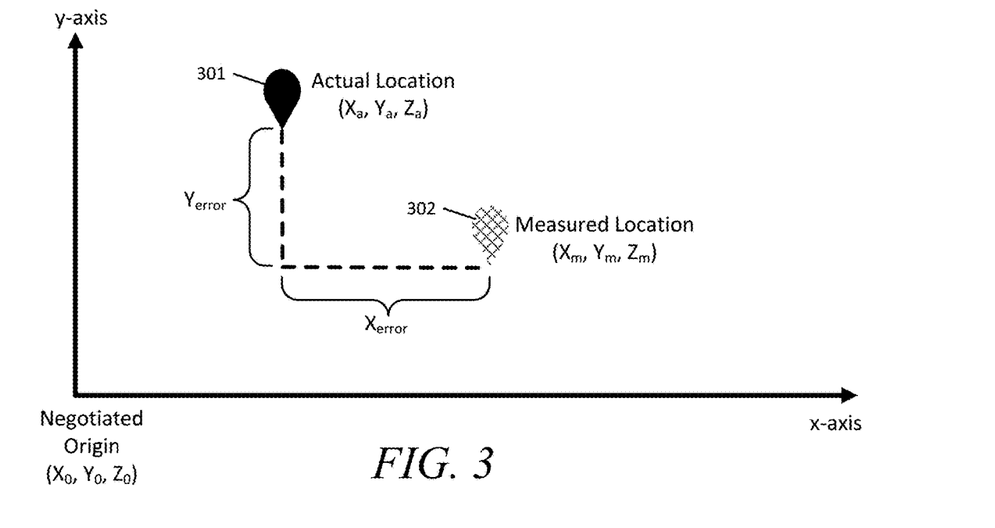
FIG. 3 is a diagram showing a representation of drift error in x-y coordinates that may occur in an RTLS such as illustrated in FIG. 1 and FIG. 2.

FIG. 3 is a diagram showing a representation of drift error in location coordinates that may occur in an RTLS such as illustrated in FIG. 1 and FIG. 2. Drift error will also occur in the z-coordinate which may represent an object's height with reference to the floor. A location tag 301 indicates the actual position of an RTLS object with coordinates "$X_a, Y_a, Z_a$" which indicate an object's position with respect to the floor, or the ground, and within a defined RTLS perimeter. The measured location of the same object indicated by location tag 302 has coordinates "$X_m, Y_m, Z_m$" which differ on the x-axis by a distance "$X_{error}$" and on the y-axis by a distance "$Y_{error}$," and on the z-axis by a distance "$Z_{error}$." The z-axis is not shown in FIG. 3 for the purpose of clarity. These error differences are the result of drift error that may occur due to factors such as environmental changes, noise, interference, the introduction of additional objects to track, etc. These errors build up exponentially and adversely impact RTLS users by the requirement for manual recalibration which means bringing down whole system.

Figure 4:
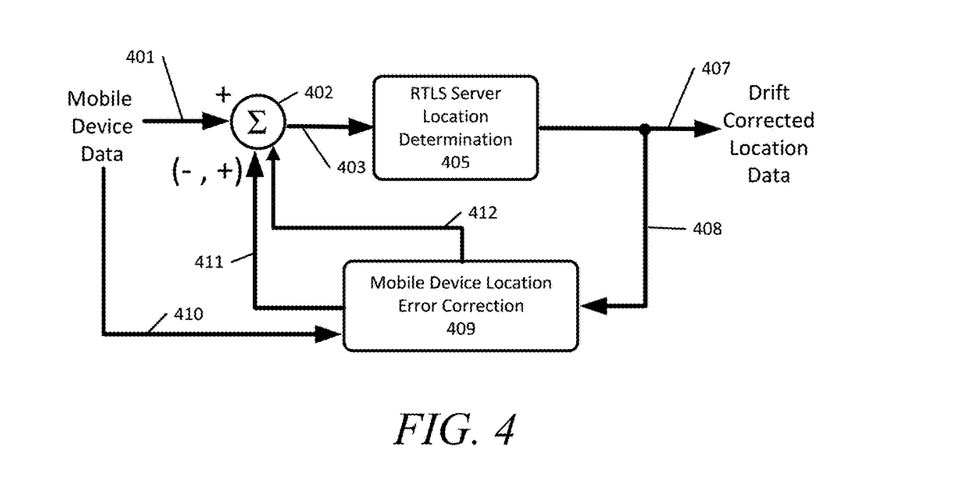
FIG. 4 is a block diagram of RTLS location error correction in accordance with various embodiments.

FIG. 4 is a block diagram of RTLS location error correction in accordance with various embodiments. Mobile device data is applied as summing block input 401, and as input 410 to mobile device location error correction logic 409. The summing block 402 provides location data input 403 to the RTLS server location determination logic 405. The RTLS server location determination logic 405 is corrected to provide drift corrected location data 407 as its output. Feedback line 408 is provided as an input to the mobile device location error correction logic 409. The mobile device location error correction logic 409 uses the mobile device data input 410 to make appropriate corrections to the location data received via the feedback line 408. The mobile device location error correction logic 409 provides either additive or negative corrections as input 411 to the summing block 402. The mobile device location error correction logic 409 may also include a control signal 412 to the summing block 402 to provide indication of whether the input 411 is an additive or a negative correction. The RTLS server location determination logic 405 may be realized on the RTLS server and the mobile device location error correction 409 may be realized on either the RTLS server or on a mobile device. The mobile device location error correction logic 409 may utilize mobile device IMU data as well as known coordinates of one or more reference points depending on circumstances. Error correction operations may be initiated by a mobile device user directly, or by the user in response to a user prompt generated by the mobile device location error correction logic 409. The user's involvement is only required for the purpose of moving the mobile device near a reference point 108 to obtain an RTLS coordinate measurement at that location. Error correction operations utilizing IMU data do not require any user action.

Figure 5A:
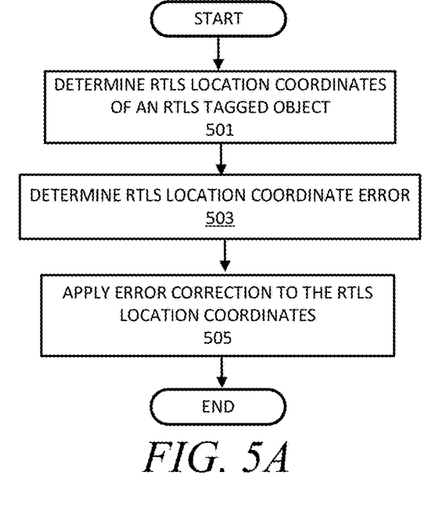
FIG. 5A is a flow chart of an RTLS method of operation in accordance with various embodiments.
Figure 5B:
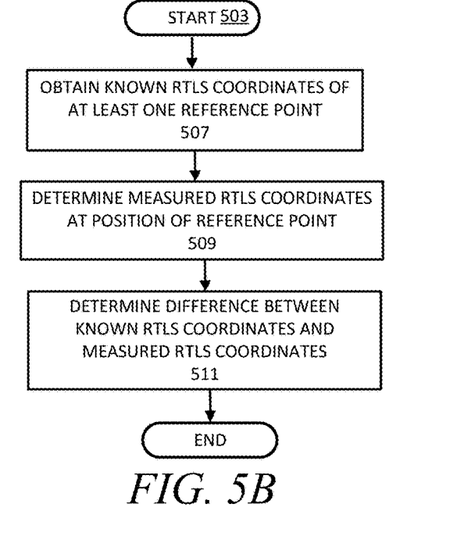
FIG. 5B is a flow chart showing detail of an example RTLS coordinate error determination process that can be used in the method of operation illustrated in FIG. 5A.

FIG. 5A is a flow chart of an RTLS location error correction method of operation in accordance with various embodiments. The method of operation begins, and in operation block 501 the RTLS server determines the RTLS location coordinates of a given RTLS tagged object, which may be a mobile device. In operation block 503, the mobile device location error correction logic determines the RTLS location coordinate error. In operation block 505, the mobile device location error correction logic applies the error correction to the RTLS location coordinates to provide drift corrected location data for the RTLS tagged object. FIG. 5B is a flow chart showing detail of an example RTLS coordinate error determination process that can be used in operation block 503 of the method of operation illustrated in FIG. 5A. In operation block 507, an RTLS tagged object such as a mobile device may obtain the known coordinates of at least one reference point 108. In operation block 509, the mobile device determines its measured RTLS coordinates at the position of the reference point. In operation block 511, the mobile device may determine the error as the difference between the known RTLS coordinates of the reference point 108 and the mobile device measured coordinates at the reference point location. The operation may then proceed as in operation block 505 in FIG. 5A, and apply error correction to the mobile device RTLS coordinates.

Figure 6:
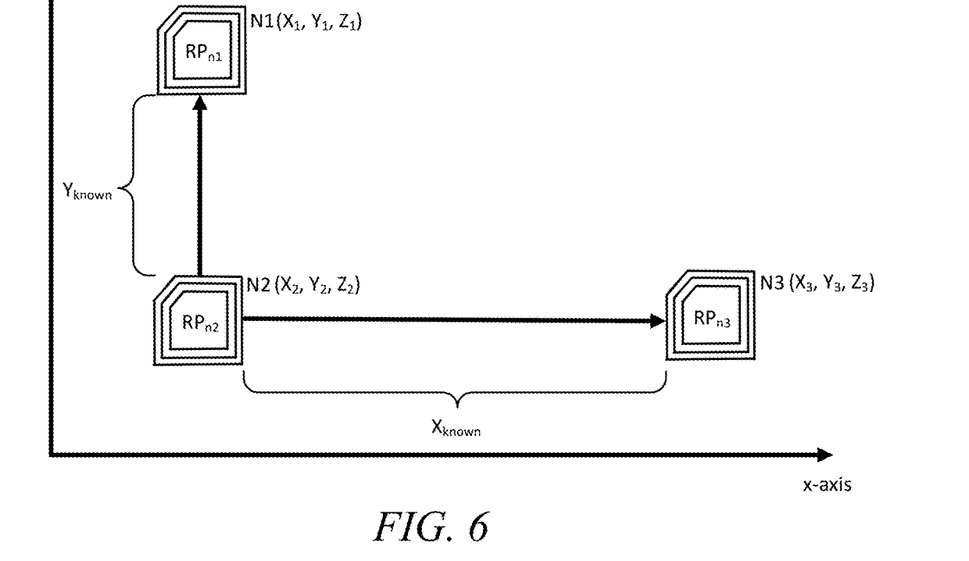
FIG. 6 is a block diagram showing fixed locations of near field communication (NFC) tags for error correction measurements in accordance with an embodiment.

FIG. 6 is a block diagram showing three near field communication (NFC) tags N1, N2 and N3, positioned at reference point locations RPn1, RPn2 and RPn3 respectively, for use in error correction measurements in accordance with an embodiment. In the specific example embodiment illustrated in FIG. 6, three NFC tags are used and are positioned at known reference point locations and have spacing that is known to the RTLS server. The reference points and corresponding NFC tags in the example shown are positioned such that one NFC tag, "N2," is positioned at the vertex of a right angle with the NFC tag "N1" located along a line substantially parallel with the y-axis of the RTLS perimeter, and with that NFC tag "N3" located along a line substantially parallel with the x-axis of the RTLS perimeter. All three tags are placed substantially at the same height which represents the z-axis. That is, the reference points RPn1 and RPn2 and corresponding NFC tags N1 and N2, are positioned to form a line substantially parallel to the y-axis of the RTLS perimeter, while the reference points RPn2 and RPn3 and corresponding NFC tags N2 and N3, are positioned to form a line substantially parallel to the x-axis of the RTLS perimeter, such that the two lines formed are substantially orthogonal.

In operation, the user of a mobile device having an RTLS tag and an NFC module can scan one or more of the NFC tags to obtain the known coordinates of the reference points corresponding to the NFC tags. The mobile device may then use the known reference point coordinates in comparison with the coordinates measured by the mobile device at the NFC tag position to determine the error in the x-direction, y-direction and z-direction. The mobile device may then send the differences between the measured coordinates and the known reference point coordinates, and/or the difference between the mobile device measured distances between respective NFC tags and the known distances, to the RTLS server for recalibration of the mobile device measured coordinates. In some embodiments, the mobile device may send this error data to the RTLS server using a single reference point NFC tag only. In other embodiments, the mobile device may send data from a mobile device inertial measurement unit (IMU) as error correction data such that the RTLS server may apply angular corrections and dynamic corrections to the mobile device position coordinates.

Some applications of the embodiments may be used in Simultaneous Localization and Mapping (SLAM) systems. In a SLAM system, use of markers like a QR code or an RFID tag may be used for reference in known relative spaces in conjunction with IMU data for error correction. In some embodiments where NFC tags are not used, the mobile device IMU may determine when the mobile device makes physical contact with the reference point by tapping or touching the reference point, to invoke obtaining the RTLS coordinate measurement at the reference point location. For example, an error correction application on the mobile device may prompt the user to touch the mobile device to a marker on a wall for a moment to initiate an error correction operation.

Figure 7:
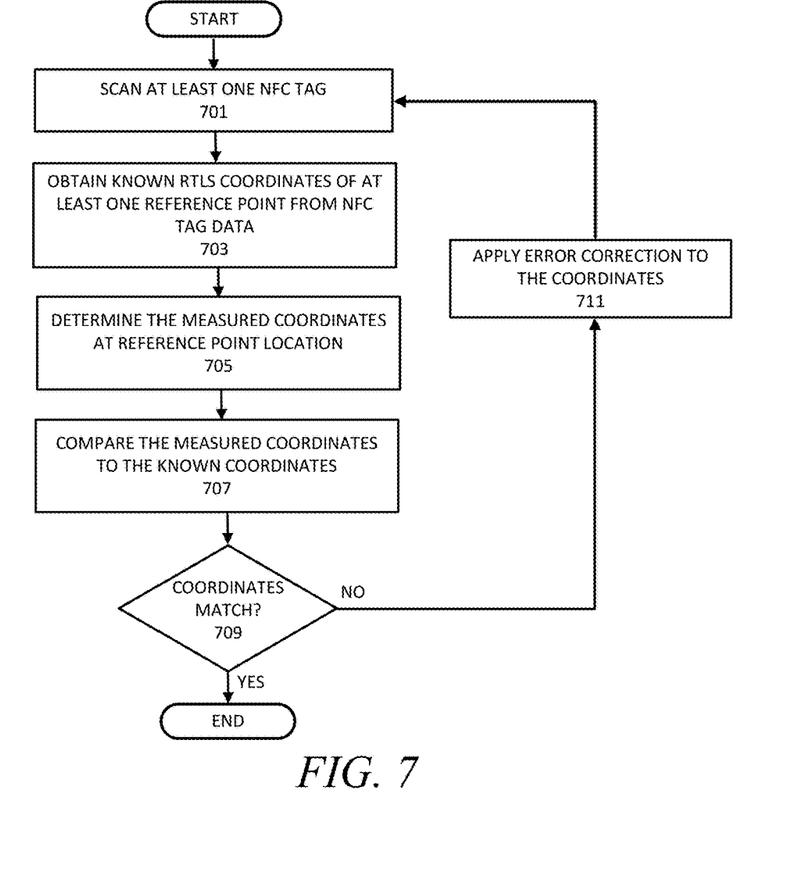
FIG. 7 is a flow chart of a method of operation in accordance with various embodiments.

FIG. 7 is a flow chart of a method of operation using at least one reference point in accordance with various embodiments. The method of operation begins, and in operation block 701 the mobile device user scans at least one NFC tag located at a reference point. In operation block 703, the mobile device obtains the known RTLS coordinates of at least one reference point from the NFC tag data. The RTLS coordinates of the reference point at which the NFC tag is located are known by the RTLS server. In operation block 705, the mobile device determines its measured coordinates at the reference point location. The RTLS measurement operation is invoked in the mobile device by the NFC scanning operation because the scanning operation is an indication of the mobile device physical proximity to the reference point. In operation block 707, the mobile device compares the measured coordinates to the known coordinates for the reference point to determine the error. In decision block 709, if the measured coordinates match the known coordinates for the reference point, then the method of operation terminates as shown. However, if the coordinates do not match in decision block 709 such that there is an error in either the x-direction, y-direction, z-direction or some combination, then the method of operation proceeds to operation block 711 and applies error correction to the coordinates. The process may loop back to operation block 701 and repeat the process until the coordinates match in decision block 709.

Figure 8:
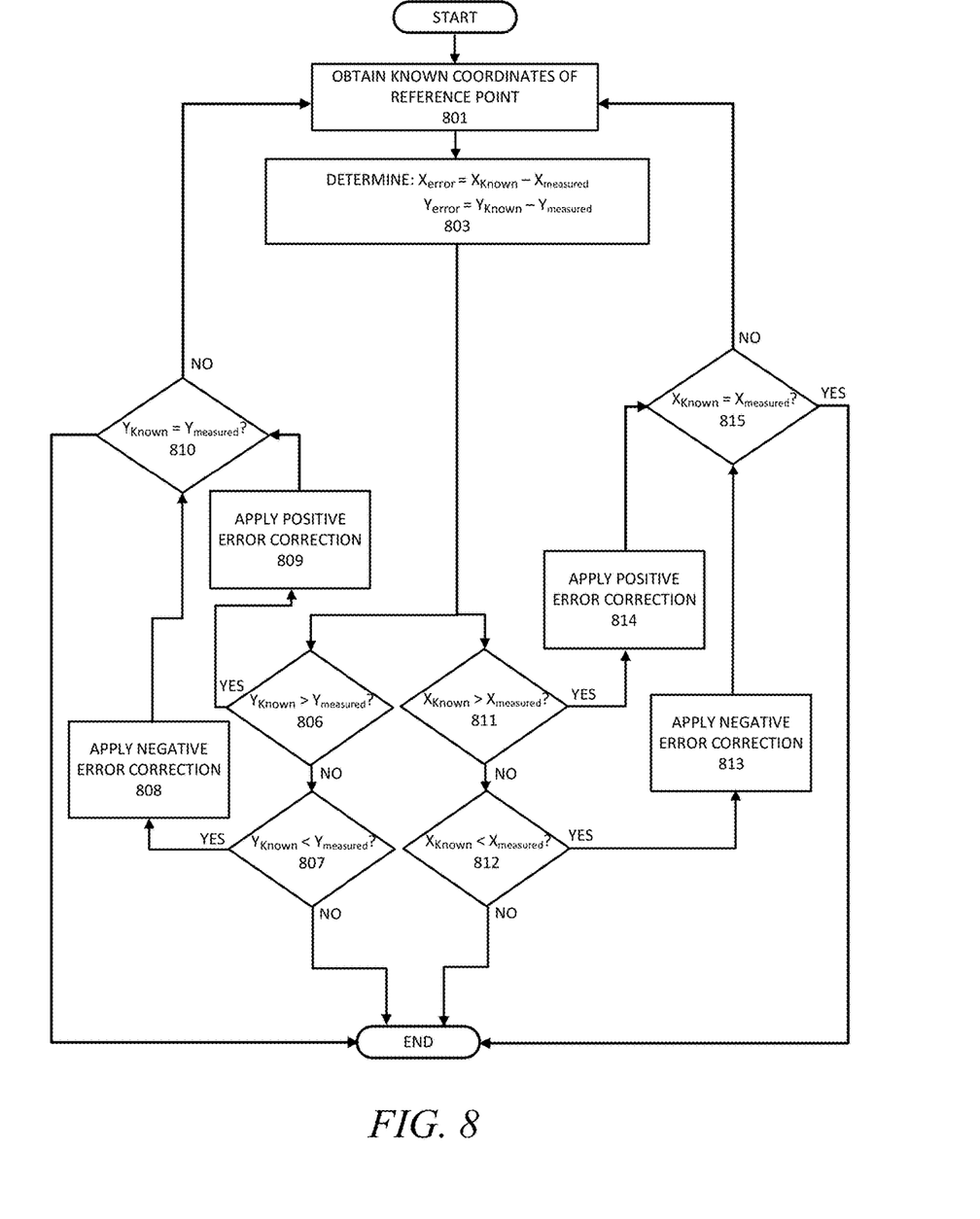
FIG. 8 is a flow chart of a method of operation as shown in FIG. 7, in accordance with an embodiment using a single NFC tag.

FIG. 8 is a flow chart of a method of operation as shown in FIG. 7, in accordance with an embodiment using a single reference point. For clarify, the example flow chart illustrates operation of error correction in the x-direction and y-direction only, however the z-direction may also be error corrected in a like manner. The method of operation begins, and in operation block 801 the mobile device user obtains the known coordinates of the reference point. This may be done by scanning a QR code or an NFC tag, or by sending a request to the RTLS server. In some embodiments, a location error correction application of the mobile device may prompt the user to tap or touch the mobile device to the reference point. For example, the user may physically contact the reference point by placing and holding the mobile device against a wall where a reference point marker or label is located. The mobile device may measure its RTLS location at the time of physically contacting the reference point and send the measured RTLS coordinates to the RTLS server with a request for reference point coordinates. The RTLS server can determine the nearest reference point based on the mobile device's measured or current RTLS server coordinates, and send the mobile device the known RTLS coordinates of the closet corresponding reference point. In some embodiments, the RTLS server can apply error correction to the mobile device RTLS coordinates based on the mobile device request given that the request indicates to the RTLS server that the mobile device is at the reference point.

The error determination made in operation block 803 may therefore be performed by the RTLS server or by the mobile device. Thus, in operation block 803, the mobile device or the RTLS server determines the error by taking the difference between the measured X-Y coordinates and the known X-Y coordinates. Error correction is then applied either by the mobile device or by the RTLS server. Error correction begins and in decision block 811, if the known x-coordinate is greater than the measured x-coordinate, then positive error correction is applied in operation block 814. If in decision block 812, the known x-coordinate is less than the measured x-coordinate, then negative error correction is applied in operation block 813. Similar comparisons are made for the known y-coordinates versus the measured y-coordinates in decision blocks 806 and decision block 807, and corresponding positive error correction block 809, and negative error correction block 808.

For the x-coordinate, in decision block 815 if the measured x-coordinate is equal to the known x-coordinate after error correction has been applied, then the method of operation terminates with respect to x-coordinate correction. Likewise, for the y-coordinate in decision block 810, if the measured y-coordinate is equal to the known y-coordinate after error correction has been applied, then the method of operation terminates with respect to y-coordinate correction. Otherwise, if the x-coordinates do not match or if the y-coordinates do not match, or if both X and Y coordinates do not match, then the method of operation returns to operation block 801 and the mobile device user again either physically contacts the reference point or scans an NFC tag etc. and the mobile device goes through the process once more until the error has been corrected to an acceptable percentage error. Error correction using the disclosed method may reduce the error in some embodiments to within 4 cm in the x-direction or y-direction. An acceptable error may be approximately between 4 to 10 centimeters in some embodiments, however what constitutes acceptable error may depend on the application.

Figure 9:
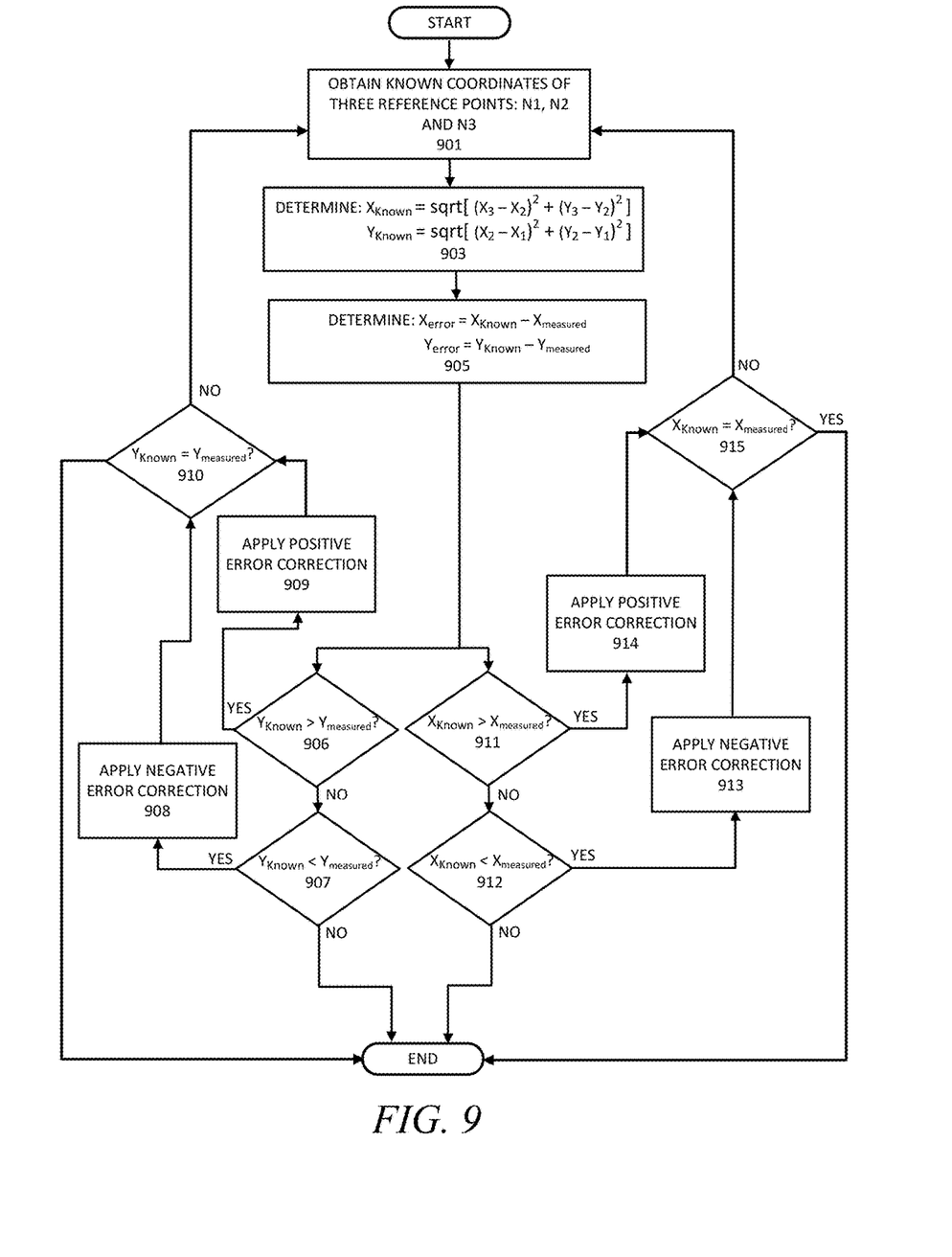
FIG. 9 is a flow chart of a method of operation as shown in FIG. 7, in accordance with an embodiment using three NFC tags.

FIG. 9 is a flow chart of a method of operation as shown in FIG. 7, in accordance with an embodiment using three reference points. Again, for clarify, the example flow chart illustrates operation of error correction in the x-direction and y-direction only, however the z-direction may also be error corrected in a like manner. The method of operation begins, and in operation block 901 the mobile device user may either physically contact the reference points in sequence, or if NFC tags are used, scan three corresponding NFC tags N1, N2, and N3, in sequence. In operation block 903, the mobile device may determine the known distances between the reference points by applying the Pythagorean theorem in conjunction with the known coordinates obtained in operation block 901. In operation block 905, the mobile device or RTLS server may then determine the error in the x-direction and the y-direction by taking the differences between the known and measured coordinates. For the x-direction, in decision block 911, if the known distance between the reference points in the x-direction is greater than the measured distance between the reference points in the x-direction, then positive error correction is applied in operation block 914. If in decision block 912, the known distance between the reference points in the x-direction is less than the measured distance between the reference points in the x-direction, then negative error correction is applied in operation block 913.

Likewise, for the y-direction, in decision block 906 if the known distance between the reference points in the y-direction is greater than the measured distance between the reference points in the y-direction, then positive error correction is applied in operation block 909. If in decision block 907, the known distance between the reference points in the y-direction is less than the measured distance between the reference points in the y-direction, then negative error correction is applied in operation block 908.

If after applying error correction, the known and measured x-direction distances do not match in decision block 915, or if the y-direction distances do not match in decision block 910, or if both X and Y distances do not match, then the method of operation returns to operation block 901 and the mobile device user again either physically contacts the reference points with the mobile device or scans the NFC tags and the mobile device goes through the process once more until the error has been corrected to an acceptable percentage error. For the three reference point error correction system, an acceptable error may also be approximately between 4 to 10 centimeters in some embodiments, however what constitutes acceptable error will also depend on the application.

Figure 10:
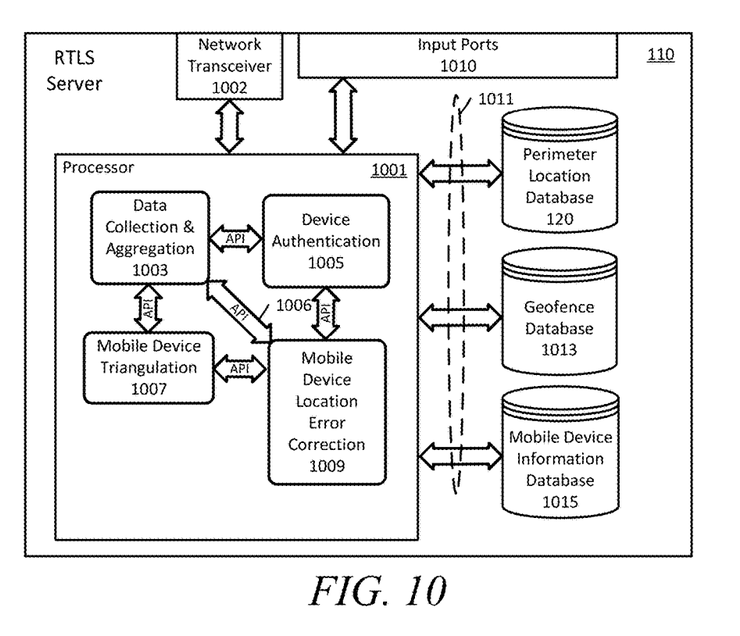
FIG. 10 is a block diagram of an example RTLS server in accordance with an embodiment.

Turning to FIG. 10, the RTLS server 110 includes at least one processor 1001 that is operatively coupled to one or more network transceivers 1002 which enable the RTLS server 110 to communicate with mobile devices either via an IP connection using the Internet or various wide area networks, wireless local area networks, etc., or via a ZeroMQ connection to the anchor tags 107 using an ultrawide band radio transceiver. A set of input ports 1010 are operative to connect with various networked devices such as video cameras 140, and/or anchor tags 107.

In some embodiments, the RTLS server 110 includes data collection and aggregation logic 1003 which collects data and maintains the perimeter location database 120, geofence database 1013 and mobile device information database 1015. The various example databases shown in FIG. 10 may be stored on cloud servers remote from the RTLS server 110, but are accessible to the RTLS server 110 via network connectivity. In some embodiments, one or more of the databases may also be distributed databases that are distributed among multiple cloud servers. In any of these embodiments, the processor 1001 is operatively coupled to the databases using any of various appropriate database interface protocols 1011 and network connectivity as needed in embodiments having remotely located or distributed databases. The geofence database 1013 stores coordinates for various sub-perimeters within the RTLS perimeter, which may be user defined. The mobile device information database 1015 maintains information about each user and that user's corresponding devices, on the RTLS.

The processor 1001 is operative to execute the data collection and aggregation logic 1003, mobile device triangulation logic 1007, mobile device location error correction logic 1009 and a device authentication function 1005. The various logic components are operative to communicate data to and from each other via various application programming interfaces (APIs) 1006. In some embodiments, the device authentication function 1005 may reside on a different server that is operatively coupled to the RTLS server 110. The data collection and aggregation logic 1003, among other things, handles receipt of the coordinate data collected by the various RTLS tagged objects including RTLS tagged mobile devices such as mobile device 101. The participating RTLS tagged mobile devices may send data to the RTLS server 110 if their respective privacy settings allow.

In some embodiments, the mobile device location error correction logic 1009 is operative to receive error correction data from mobile devices on the RTLS, and update the perimeter location database 120 accordingly. In some embodiments, the mobile device location error correction logic 1009 is operative to receive the error correction data as corrected RTLS coordinates where the respective mobile device has determined the appropriate RTLS coordinate correction. In other embodiments, the mobile device location error correction logic 1009 is operative to receive the error correction data as measured error data such as, but not limited to, mobile device IMU data, or x-y location error determined by a mobile device using one or more fixed position NFC tags, or mobile device measurements made at a reference point location. In these embodiments, the mobile device location error correction logic 1009 is operative to determine the RTLS coordinate error and/or RTLS coordinate error correction for the corresponding mobile device and to update the perimeter location database 120 accordingly.

Figure 11:
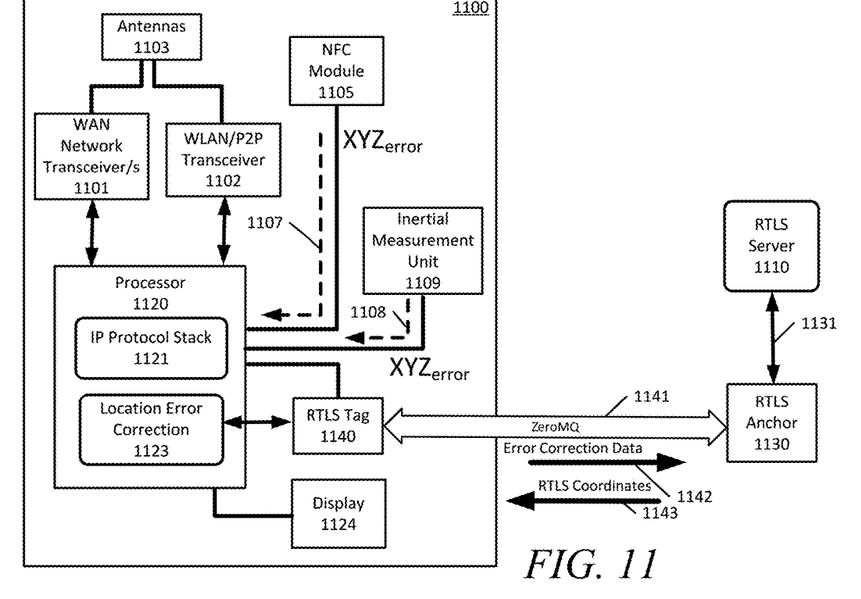
FIG. 11 is a block diagram of an example mobile device in communication with an RTLS server in accordance with various embodiments.

FIG. 11 is a block diagram of an example mobile device 1100 connected to an RTLS server 1110 in accordance with embodiments. The mobile device 1100 includes a processor 1120 operative to execute an IP protocol stack 1121 and a location error correction module 1123. A wireless wide area network (WAN) transceiver 1101 provides wireless communication capabilities for one or more wide area network communications systems using any of various technologies such as, but not limited to, CDMA, UMTS, GSM, LTE, etc. and also provides Internet connectivity over the wireless interface to communicate with various servers such as the RTLS server 1110. A second wireless transceiver, WLAN/P2P transceiver 1102, provides wireless local area network connections, peer-to-peer connections, etc. and may provide wireless connectivity using technologies such as, but not limited to, WiFi®, Bluetooth®, Wireless USB, ZigBee, or other technologies, etc. The WLAN/P2P transceiver 1102 may also provide Internet connectivity. Both the WAN transceivers 1101 and the WLAN/P2P transceiver 1102 are operatively coupled to antennas 1103 which may include a single antenna, multiple antennas, an antenna array or some combination thereof. The mobile device may also include a near field communication (NFC) module 1105 operative to scan NFC location tags and send coordinate error correction data 1107 to the processor 1120. The coordinate error correction data 1107 sent to processor 1120 is used by the location error correction module 1123 to correct drift in the mobile device 1100 RTLS coordinates.

An inertial measurement unit (IMU) 1109 may include a gyroscope, accelerometer and magnetometer, and is operative to generate and send data such as coordinate error correction data 1108 to processor 1120, also to be used by the location error correction module 1123 to correct drift in the mobile device 1100 RTLS coordinates. The IMU 1109 is also used to adjust a display 1124 by sensing the position of the mobile device 1100 as being horizontal or vertical, shaken or tilted, etc. The processor 1120 is operative to control the display 1124 to provide a graphical user interface (GUI) related to the RTLS system and to display a map and indicators corresponding to objects of interest that the mobile device 1100 is visually tracking, or to track the mobile device 1100 location within the RTLS perimeter. The processor 1120 is operative to communicate with the display 1124 and provide overlays on displayed maps, such as an overlay object on the map that represents an object of interest being tracked and a position indicator for the mobile device 1100. The processor 1120 updates the position of the mobile device 1100 and any object of interest on the display by updating the overlay object (such as, but not limited to an icon or avatar) and may also receive RTLS coordinate updates for the object of interest from the RTLS server 1110.

In the example of FIG. 11, an RTLS tag 1140 is operatively coupled to the processor 1120 and is operative to communicate with an RTLS anchor tag 1130 via a ZeroMQ connection 1141 using ultrawide band radio. The RTLS tag 1140 is operative to send x-y error correction data 1142 from the processor 1120 to the RTLS server 1110 and receive updated RTLS coordinates 1143 for the mobile device 1100 or for an object of interest in response. The coordinate error correction data 1142 communicated through the RTLS anchor tag 1130 may be NFC coordinate error correction data 1107 or IMU coordinate error correction data 1108, or both, depending on which error correction approach the mobile device 1100 is using at a particular time or in a particular RTLS. In some embodiments, the error correction data 1142 may be updates to the most recent RTLS coordinates where the location error correction module 1123 determines updated RTLS coordinates independently from the RTLS server 1110. The RTLS anchor tag 1130 is operatively coupled to the RTLS server 1110 via any appropriate backhaul 1131.

Figure 12:
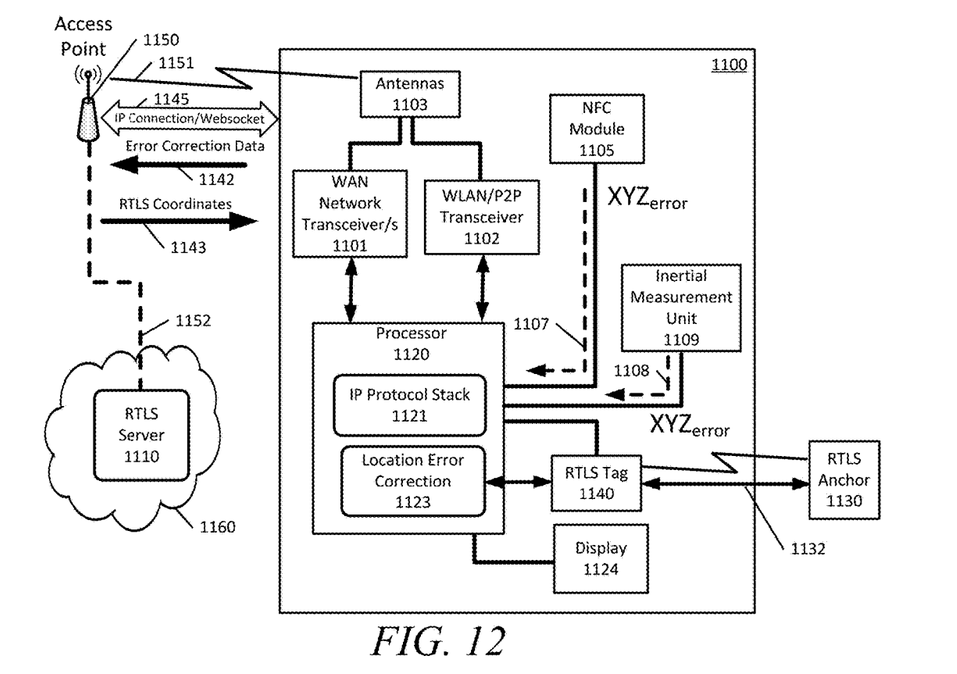
FIG. 12 is a block diagram of an example mobile device as shown in FIG. 11, in communication with an RTLS server using a wireless access point in accordance with various embodiments.

In the example of FIG. 12, the RTLS tag 1140 may communicate with the RTLS anchor tag 1130 over an ultrawide band radio link 1132 to obtain RTLS coordinates and to send coordinate error correction data. However, the mobile device 1100 may also communicate with an access point 1150 using a WLAN radio link 1151 to establish an Internet Protocol connection, web socket 1145 to the RTLS server 1110. The access point 1150 provides connectivity 1152 to the RTLS server 1110 over the Internet 1160. In the FIG. 12 example, the mobile device 1100 can send error correction data 1142 to the RTLS server 1110 over the web socket connection 1145 and receive RTLS coordinates 1143 for the mobile device 1100 or for an object of interest. In the example embodiment of FIG. 12, the mobile device 1100 may not include the RTLS tag 1140 and may communicate with the RTLS server 1110 solely over the web socket connection 1145.

In addition to the RTLS coordinate drift errors addressed above, the RTLS coordinates are prone to other errors due to latency, overshoot errors and errors in determining direction of movement. In one example of "zero-in" lag time, there is a real-time lag in obtaining a position fix due to latency. That is, the coordinate data from the RTLS server becomes stale and static because it may be delayed for a number of seconds. In an example of overshoot error, when a mobile device is moved and stopped, then data from server shows overshoot initially and eventually zeros in with a delay in time. In an example of incorrect direction determination, which is also a lag time issue, when the user changes direction, RTLS data takes time to reflect the change in direction. Some embodiments may correct these errors by utilizing data from the mobile device IMU.

Figure 13:
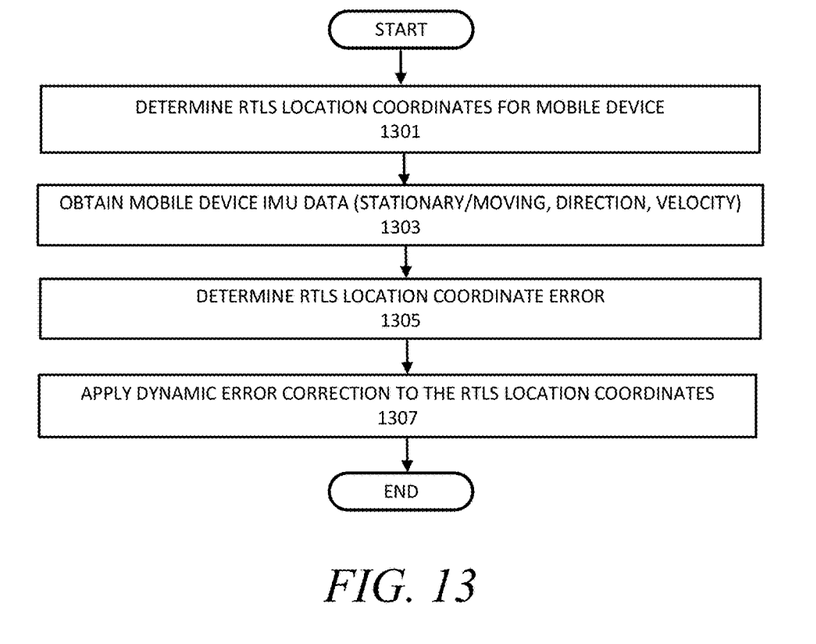
FIG. 13 is a flow chart of a method operation of an RTLS server in accordance with an embodiment.

FIG. 13 is a flowchart of an example method of operation of an RTLS server in accordance with an embodiment in which the RTLS server uses mobile device IMU data to perform dynamic error correction. The method of operation begins, and in operation block 1301, the RTLS server determines the RTLS coordinates for a given mobile device. In operation block 1303, the RTLS server obtains mobile device IMU data, including whether the mobile device is stationary or moving, the mobile device direction and velocity. In operation block 1305, the RTLS server may determine the RTLS location coordinate error using the IMU data. In operation block 1307, the RTLS server applies dynamic error correction to the mobile device RTLS location coordinates to correct for latency, overshoot and direction determination errors. The method of operation then terminates as shown.

Figure 14:
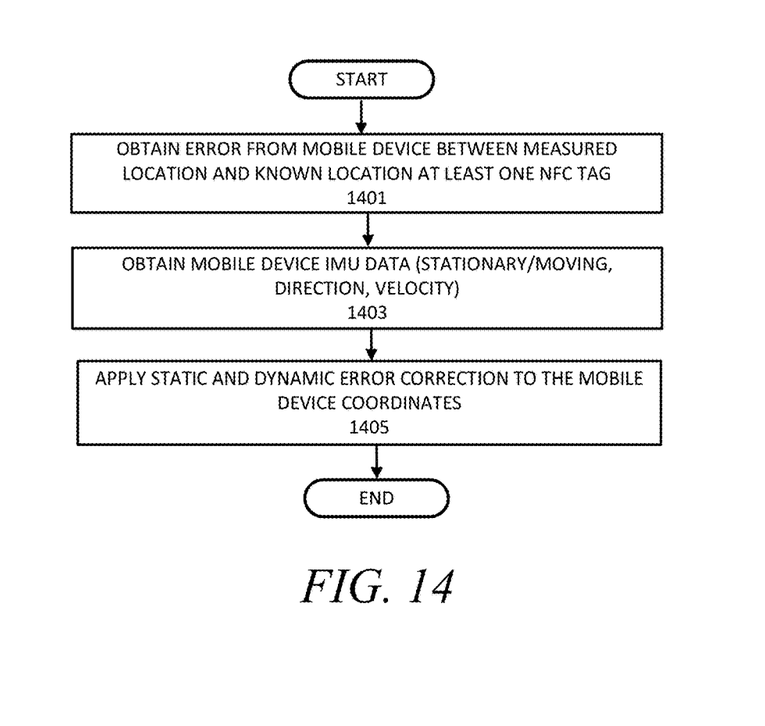
FIG. 14 is a flow chart of a method operation of an RTLS server in accordance with an embodiment.

The method of operation illustrated in FIG. 14 is an example in which the RTLS server uses both NFC tag error correction and IMU data error correction. The method of operation begins and in operation block 1401, the RTLS server obtains error from the mobile device between a measured location and a known location for at least one fixed position NFC tag. In operation block 1403, the RTLS server obtains mobile device IMU data including whether the mobile device is stationary or moving, and the mobile device direction and velocity. In operation block 1405, the RTLS server applies static and dynamic error correction to the mobile device RTLS coordinates. The method of operation then terminates as shown.

Figure 15:
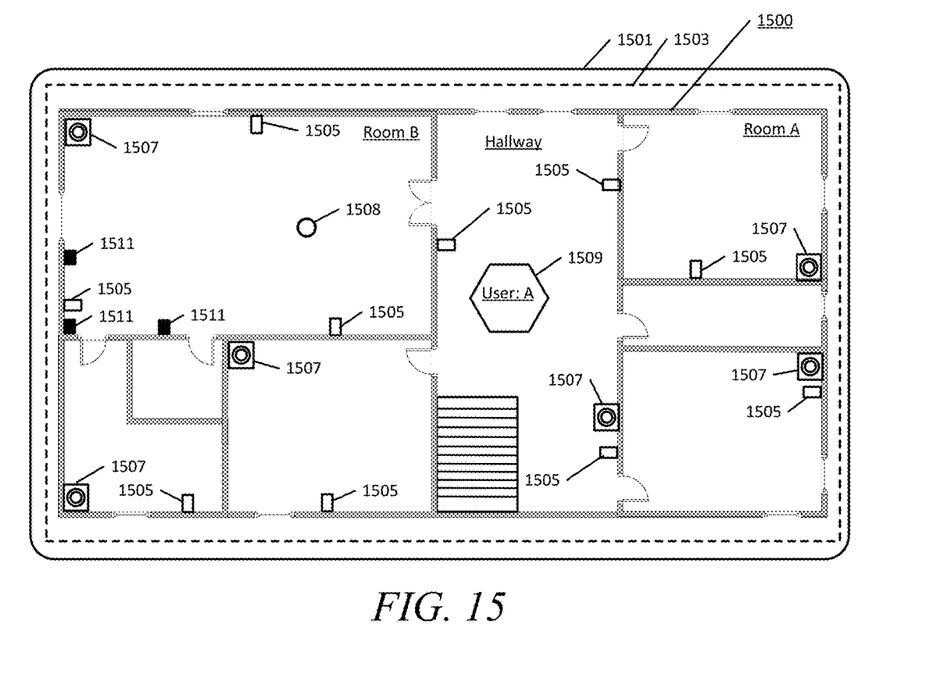
FIG. 15 is an example map of an RTLS perimeter, which in this example is a floor plan, displayed in a graphical user interface (GUI) on a display of a mobile device.

FIG. 15 is an example map 1500 that can be shown within a GUI 1503 on an interested device display 1501. The map 1500 is a floor plan and may show the locations of anchor tags 1505 and video cameras 1507 in some embodiments. In this example, the interested device is a mobile device. The user's location which corresponds to the interested device location, is indicated by the circle overlay 1508. The position of an object of interest is indicated by the hexagon overlay 1509 and will move in real time as the object of interest associated with the hexagon overlay 1509 moves within the RTLS area. Likewise, the circle overlay 1508 will change position on the map 1500 as the user moves about within the RTLS perimeter. The location of reference points 1511 are also indicated on the map 1500 to aid the user in finding the reference points 1511 to perform error correction operations.

In some embodiments, the interested device may be provided real-time video from the video cameras 140 for objects in their respective field-of-view 141. The object of interest may be indicated by an overlay on the video as described above.

One of ordinary skill will understand and appreciate that the disclosed embodiments have various applications such as, but not limited to, gaming, security systems, etc. and such various applications are contemplated by the present disclosure.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of operating a real time locating system (RTLS), the method comprising:
 obtaining known RTLS coordinates of a reference point located within an RTLS perimeter;

determining, by an RTLS tagged object, a difference due to RTLS drift error between known RTLS coordinates of the reference point, and measured RTLS coordinates at the reference point location; and determining corrected RTLS coordinates for the RTLS tagged object using the difference to correct the RTLS drift error.

2. The method of claim 1, further comprising:
bringing the RTLS tagged object in physical contact with the reference point; and
determining the measured RTLS coordinates of the RTLS tagged object in physical contact with the reference point location.

3. The method of claim 1, further comprising:
obtaining the known RTLS coordinates of the reference point from an RTLS server.

4. The method of claim 1, further comprising:
scanning a near field communication (NFC) tag located at the reference point to obtain the known RTLS coordinates.

5. The method of claim 1, further comprising:
sending the corrected RTLS coordinates of the RTLS tagged object to an RTLS server, in response to determining the corrected RTLS coordinates.

6. The method of claim 2, further comprising:
determining that the RTLS tagged object is in physical contact with the reference point using an inertial measurement unit (IMU) of the RTLS tagged object; and
determining the measured RTLS coordinates in response to IMU data indicating that the RTLS tagged object is in physical contact with the reference point.

7. A method of operating a real time locating system (RTLS), the method comprising:
obtaining known RTLS coordinates of first, second and third reference points within an RTLS perimeter;
determining, by an RTLS tagged object, a first measured distance between the first and second reference points, and a second measured distance between the second reference point and the third reference point;
determining a first RTLS drift error between the first measured distance and a known distance between the first and second reference points;
determining a second RTLS drift error between the second measured distance and a known distance between the second and third reference points; and
correcting the measured RTLS coordinates of the RTLS tagged object using the first RTLS drift error and the second RTLS drift error.

8. The method of claim 7, further comprising:
determining, by the RTLS tagged object, a first known distance between the first and second reference points, and a second known distance between the second reference point and the third reference point, using the known RTLS coordinates of the first, second and third reference points.

9. The method of claim 7, further comprising:
bringing the RTLS tagged object in physical contact with each of the first, second and third reference points; and
determining the measured RTLS coordinates of the RTLS tagged object at each respective reference point in response to the RTLS tagged object being in physical contact with the respective reference point, the measured RTLS coordinates having an RTLS drift error.

10. The method of claim 7, further comprising:
scanning a first, second, and third near field communication (NFC) tag to obtain the known RTLS coordinates of the first, second and third reference points, where the first, second and third NFC tags respectively are located at, and identify, the first, second and third reference points;
determining the known distance between the first and second NFC tag, and the known distance between the second and third NFC tag, using the known RTLS coordinates of the first, second and third NFC tags;
comparing the first measured distance with the known distance between the first and second NFC tags to determine the first RTLS drift error; and
comparing the second measured distance with the known distance between the second and third NFC tags to determine the second RTLS drift error.

11. The method of claim 7, further comprising:
sending the corrected RTLS coordinates of the RTLS tagged object to an RTLS server to correct the RTLS drift error.

12. The method of claim 9, further comprising:
determining that the RTLS tagged object is in physical contact sequentially with each of the respective reference points using an inertial measurement unit (IMU) of the RTLS tagged object; and
determining the measured RTLS coordinates at each respective reference point in response to IMU data indicating that the RTLS tagged object is in physical contact with the respective reference point.

13. A mobile device, comprising:
an RTLS tag;
an inertial measurement unit (IMU);
a processor, operatively coupled to the RTLS tag and to the IMU, the RTLS processor operative to:
obtain known RTLS coordinates of a reference point located within an RTLS perimeter;
determine a difference due to RTLS drift error between known RTLS coordinates of the reference point, and measured RTLS coordinates at the reference point location; and
determine corrected RTLS coordinates for the mobile device using the difference to correct the RTLS drift error.

14. The mobile device of claim 13, wherein the processor is further operative to:
determine that the mobile device is in physical contact with the reference point using IMU data; and
determine the measured RTLS coordinates of the mobile device in physical contact with the reference point location, the measured RTLS coordinates having an RTLS drift error.

15. The mobile device of claim 13, wherein the processor is further operative to:
obtain the known RTLS coordinates of the reference point from an RTLS server using the RTLS tag.

16. The mobile device of claim 13, further comprising:
a near field communication (NFC) module operatively coupled to the processor, the NFC module operative to scan an NFC tag located at the reference point to obtain the known RTLS coordinates of the reference point.

17. A mobile device, comprising:
an RTLS tag;
an inertial measurement unit (IMU);
a processor, operatively coupled to the RTLS tag and to the IMU, the RTLS processor operative to:
obtain known RTLS coordinates of first, second and third reference points within an RTLS perimeter;

determine a first measured distance between the first and second reference points, and a second measured distance between the second reference point and the third reference point;

determine a first RTLS drift error between the first measured distance and a known distance between the first and second reference points;

determine a second RTLS drift error between the second measured distance and a known distance between the second and third reference points; and correct the measured RTLS coordinates of the mobile device using the first RTLS drift error and the second RTLS drift error.

18. The mobile device of claim 17, wherein the processor is further operative to:

determine a first known distance between the first and second reference points, and a second known distance between the second reference point and the third reference point, using the known RTLS coordinates of the first, second and third reference points.

19. The mobile device of claim 17, further comprising:

a near field communication (NFC) module operatively coupled to the processor, the NFC module operative to:

scan a first, second, and third NFC tag to obtain the known RTLS coordinates of the first, second and third reference points, where the first, second and third NFC tags respectively are located at, and identify, the first, second and third reference points;

wherein the processor is further operative to:

determine the known distance between the first and second NFC tag, and the known distance between the second and third NFC tag, using the known RTLS coordinates of the first, second and third NFC tags;

compare the first measured distance with the known distance between the first and second NFC tags to determine the first RTLS drift error; and compare the second measured distance with the known distance between the second and third NFC tags to determine the second RTLS drift error.

20. The mobile device of claim 17, wherein the processor is further operative to:

determine that the mobile is in physical contact sequentially with each of the respective reference points using the IMU; and determine the measured RTLS coordinates at each respective reference point in response to IMU data indicating that the mobile device is in physical contact with the respective reference point.

* * * * *